United States Patent
Caldwell et al.

(10) Patent No.: US 10,006,833 B1
(45) Date of Patent: Jun. 26, 2018

(54) METHOD FOR VORTEX GENERATOR ARRAY SIZING AND PLACEMENT WITHIN OFFSET DIFFUSERS

(71) Applicant: NORTHROP GRUMMAN SYSTEMS CORPORATION, Falls Church, VA (US)

(72) Inventors: Nicholas V. Caldwell, Melbourne, FL (US); Trajaen J. Troia, Melbourne, FL (US); Richard Crouse, Huntington Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 112 days.

(21) Appl. No.: 15/246,010

(22) Filed: Aug. 24, 2016

(51) Int. Cl.
| | | |
|---|---|---|
| *F03D 1/06* | (2006.01) |
| *B64F 5/00* | (2017.01) |
| *G01M 15/14* | (2006.01) |
| *G01B 21/02* | (2006.01) |
| *G01B 21/16* | (2006.01) |

(52) U.S. Cl.
CPC ........... *G01M 15/14* (2013.01); *B64F 5/0045* (2013.01); *G01B 21/02* (2013.01); *G01B 21/16* (2013.01)

(58) Field of Classification Search
CPC ....... B64F 5/0045; G01B 21/02; G01B 21/16; F03D 1/0641; G01M 15/14
See application file for complete search history.

(56) References Cited

U.S. PATENT DOCUMENTS

| | | |
|---|---|---|
| 6,285,968 B1 | 9/2001 | Motoyama et al. |
| 6,371,414 B1 | 4/2002 | Truax et al. |
| 6,512,999 B1 | 1/2003 | Dimas et al. |
| 6,654,710 B1 | 11/2003 | Keller |
| 6,682,021 B1 | 1/2004 | Truax et al. |
| 7,357,358 B2 | 4/2008 | Lacy et al. |
| 7,774,171 B2 | 8/2010 | Chou et al. |
| 7,784,732 B2 | 8/2010 | Owens et al. |
| 7,914,259 B2 * | 3/2011 | Godsk ................... F03D 1/0641 416/146 R |
| 8,528,601 B2 | 9/2013 | Dahm et al. |

(Continued)

OTHER PUBLICATIONS

Lee, S. et al. "Normal Shock Boundary Layer Control with Various Vortex Generator Geometries" Computers and Fluids 49, 2011, pp. 233-246.

(Continued)

*Primary Examiner* — Bryan Bui
(74) *Attorney, Agent, or Firm* — John A. Miller; Shumaker, Loop & Kendrick, LLP

(57) ABSTRACT

A method for optimizing size and position parameters of an array of vortex generator blades configured on an offset diffuser in an inlet of an aircraft engine. The method includes providing a computational fluid dynamic analysis of air flowing through the diffuser that identifies a height of a local boundary layer at a plurality of positions across the diffuser substantially parallel to the flow of air and a flow velocity vector at each of the plurality of positions at one half of a height of the local boundary layer. The method also includes determining an angle orientation of the blades using the boundary layer height and the flow vector, determining the length and height of the blades using the boundary layer height, and determining the number and spacing of the blades using the width of the diffuser.

21 Claims, 3 Drawing Sheets

(56) References Cited

U.S. PATENT DOCUMENTS

| | | | |
|---|---|---|---|
| 2008/0121301 A1 | 5/2008 | Norris | |
| 2010/0008787 A1* | 1/2010 | Godsk | F03D 1/0641 |
| | | | 416/223 R |
| 2015/0361952 A1* | 12/2015 | Petsche | F03D 1/0683 |
| | | | 416/223 A |
| 2017/0314530 A1* | 11/2017 | Herrig | F03D 1/0641 |

OTHER PUBLICATIONS

Lee, S. et al. "Supersonic Boundary Layer Interactions with Various Micro-Vortex Generator Geometries" 39th AIAA Fluid Dynamics Conference, San Antonio, Texas, Jun. 22-25, 2009, 25 pgs.

Lin, John C. "Review of Research on Low-Profile Vortex Generators to Control Boundary-Layer Separation" Progress in Aerospace Sciences 38, 2002, pp. 389-420.

\* cited by examiner

METHOD FOR VORTEX GENERATOR ARRAY SIZING AND PLACEMENT WITHIN OFFSET DIFFUSERS

BACKGROUND

Field

This invention relates generally to a method for determining the size, position and orientation of an array of vortex generators positioned within an inlet of an aircraft engine and, more particularly, to a method for determining the size, position and orientation of an array of vortex generators positioned within an offset diffuser of the inlet of a turbojet or turbofan aircraft engine, where the method is effective to determine the size, position and orientation of the vortex generators for various diffusers without the need for costly trial and error processes.

Discussion

Many aircraft designs are known in the art, both commercial and military, where the aircraft may operate at supersonic or subsonic speeds. Some aircraft include an inlet diffuser having a shape where an inlet of the diffuser is smaller than an outlet of the diffuser, which reduces the speed of the air entering the engine as a result of the increase in static pressure from the entrance to the exit of the diffuser. Sometimes these diffusers are offset diffusers where the inlet and outlet of the diffuser are misaligned and sometimes the diffuser has a relatively short length, which often requires aggressive inlet curvatures.

For an aircraft in free flight, a low velocity, low pressure boundary layer of air builds up on the fuselage of the aircraft. The boundary layer is generated as a result of friction forces on the aircraft fuselage, where air immediately adjacent to the fuselage has a zero velocity and as the distance from the fuselage increases, the velocity of the air also increases as determined by the speed of the aircraft and the viscosity of the air. As the distance from the fuselage increases, the pressure forces of the airflow overcome the friction effect of the fuselage, where at some distance from the aircraft, the airflow becomes a free stream.

One particular characteristic of airflow often caused by aggressive inlet diffuser curvatures is known as secondary flow, which is a deleterious phenomenon during which inlet air is inefficiently redirected due to the low energy boundary layer's inability to negotiate the large pressure gradient induced by the high curvature of the diffuser. The secondary flow often times coalesces at the diffuser centerline, detaches from the surface of the aircraft and creates air vortices in the main flow that could enter the engine, which could cause distortions in the engine's compression system aerodynamics, and which may result in operability issues, such as engine surge or stall, due to distortion levels beyond the engine's limitations.

SUMMARY

The present invention discloses and describes a method for effectively determining the size, position and orientation of an array of vortex generator blades positioned within an offset inlet diffuser of an engine for an aircraft that does not require test data or other trial and error processes for different designs of the vortex generator array. The method includes conducting a Navier-Stokes computational fluid dynamic analysis of air flowing through the diffuser that identifies a height of a local boundary layer at a plurality of positions across the diffuser parallel to the flow of air and a flow velocity vector at each of the plurality of positions at one half of the height of the local boundary layer. The method also includes determining an angle orientation of the vortex generator blades using the boundary layer height and the flow vector, determining the length and height of the blades using the boundary layer height, and determining the number and spacing of the blades using the width of the diffuser.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for determining the size and position of an array of vortex generators within an offset inlet diffuser of an engine for an aircraft is merely exemplary in nature, and is in no way intended to limit the invention or its applications or uses. For example, the present invention discloses employing the vortex generators to compensate for vortices created by secondary flow caused by an inlet diffuser into the aircraft. However, the method of the invention may have application for countering other airflows in other systems.

The present invention proposes a method for determining the size, spacing, location, orientation, etc. of an array of vortex generators configured within an offset inlet diffuser of an engine for an aircraft. The method provides a design technique for the array of vortex generators for a generic offset diffuser through an initial computational assessment and then a set of guidelines that creates the physical geometry to be used to manage the distortion-inducing secondary flows in a manner that circumvents an extensive amount of trial and error.

Figure 1:
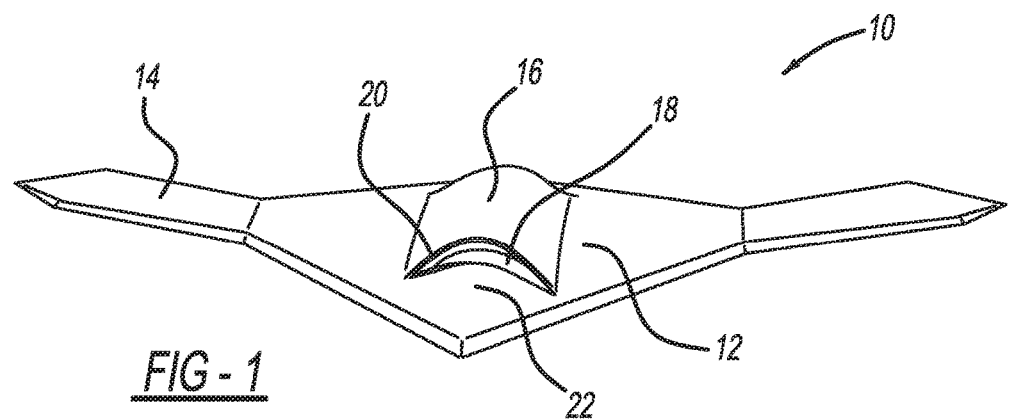
FIG. 1 is an isometric view of an aircraft.

FIG. 1 is an isometric view of an aircraft 10 including a fuselage 12 and wings 14. The aircraft 10 is intended to generally represent any military or commercial aircraft that may operate at subsonic or supersonic speeds, and may have aggressive engine inlet design characteristics and features. The aircraft 10 is a single engine aircraft, where the engine is generally represented at 16 on top of the fuselage 12. However, other aircraft designs may include multiple engines, under-wing engines, etc. The engine 16 includes an inlet 18 having a forward facing cowl 20 and an inlet ramp 22 with a particular configuration and shape for providing air compression to reduce the speed of the air as it enters the inlet 18.

Figure 2:
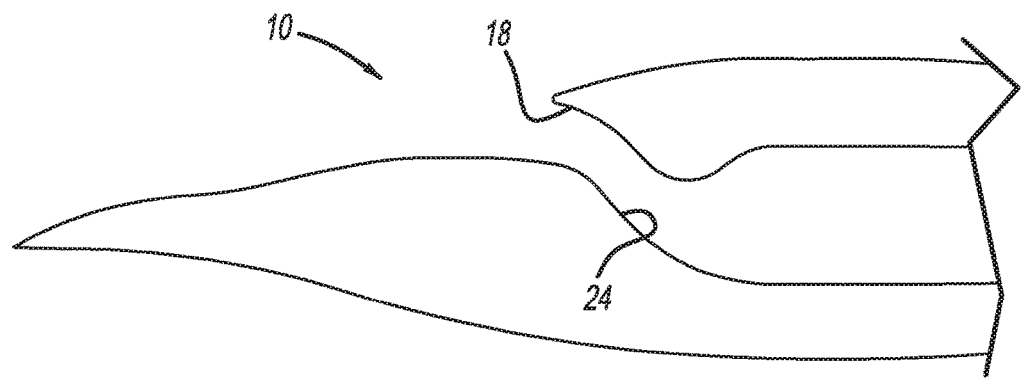
FIG. 2 is a cut-away, cross-sectional view of an inlet showing an offset diffuser of the aircraft in FIG. 1.

FIG. 2 is a cut-away, cross-sectional view of the aircraft 10 showing the inlet 18. The inlet 18 includes an offset diffuser 24 positioned downstream from the cowl 20, which is relatively short and has an aggressive curvature that causes secondary flow induced vortices and distortions within the inlet 18. As is apparent, the diffuser 24 is an offset diffuser in that the inlet and outlet portions of the diffuser 24 are not aligned with each.

Figure 3:
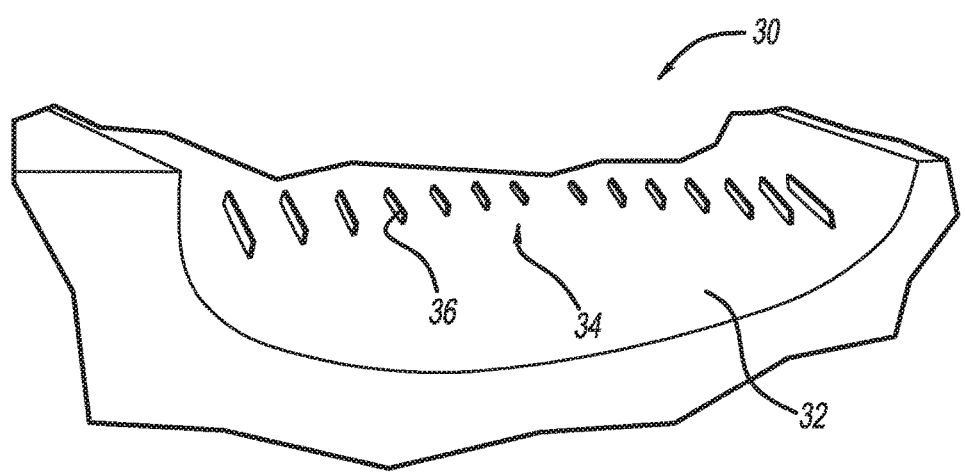
FIG. 3 is an isometric view of a portion of a duct including an array of vortex generators.

As mentioned, the present invention is a method for determining the height, length, width, spacing, orientation, etc. of an array of vortex generators provided on the diffuser 24 so as to eliminate or reduce the adverse affects of the secondary flow induced distortion. FIG. 3 is a cut-away isometric view of a half portion of an offset inlet duct 30 that is representative of any suitable inlet structure or diffuser for an aircraft of the type being discussed herein. The inlet duct 30 includes a curved flow surface 32 intended to represent the surface of the duct 30 proximate the fuselage of the aircraft where secondary flow would occur, and where the flow into the engine inlet would be from the front of the image to the back of the image in this diagram. An array 34 of vortex generator blades 36 are affixed to the surface 32, and operate to create airflow vortices that counter and reduce the effect of the vortices created by the secondary flow. As is apparent, the length of the vortex generator blades 36 and the height of the vortex generator blades 36 gradually increase from a center portion of the duct 30 to an outer edge of the duct 30, which is necessary to address the increase in the size and height of the local boundary layer flowing through the duct 30. The blades 36 can be mounted or attached to the surface 32 in any suitable manner that does not interrupt the flow of air across the blades 36, such as being integrally molded or cast, secured thereto by adhesive, etc.

Figure 4:
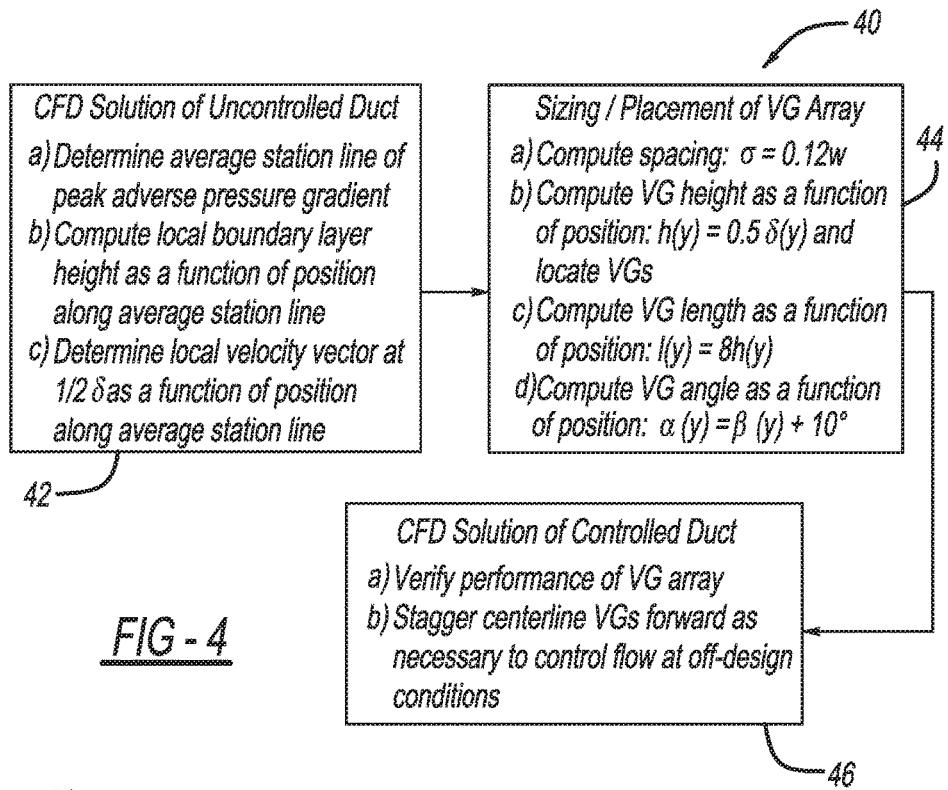
FIG. 4 is a flow chart diagram of a method for sizing and placement of the array of vortex generators shown in FIG. 3.

FIG. 4 is a flow chart diagram 40 showing a process for determining the number of the generator blades 36, the distance between the generator blades 36, the length of the generator blades 36, the height of the generator blades 36, and the angular orientation of the generator blades 36 for a particular inlet diffuser without actually having to perform a trial and error testing process to determine those parameters. As will be well understood by those skilled in the art, the several and various steps and processes discussed herein to describe the invention may be referring to operations performed by a computer, a processor or other electronic calculating device that manipulate and/or transform data using electrical phenomenon.

Figure 5:
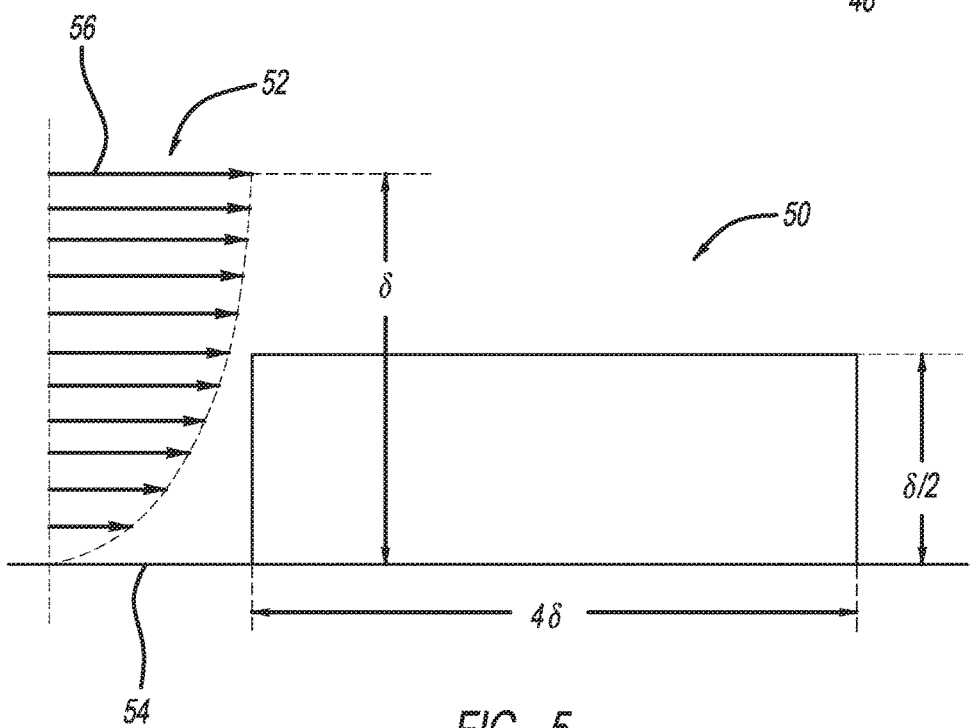
FIG. 5 is a side illustration of a vortex generator.
Figure 6:
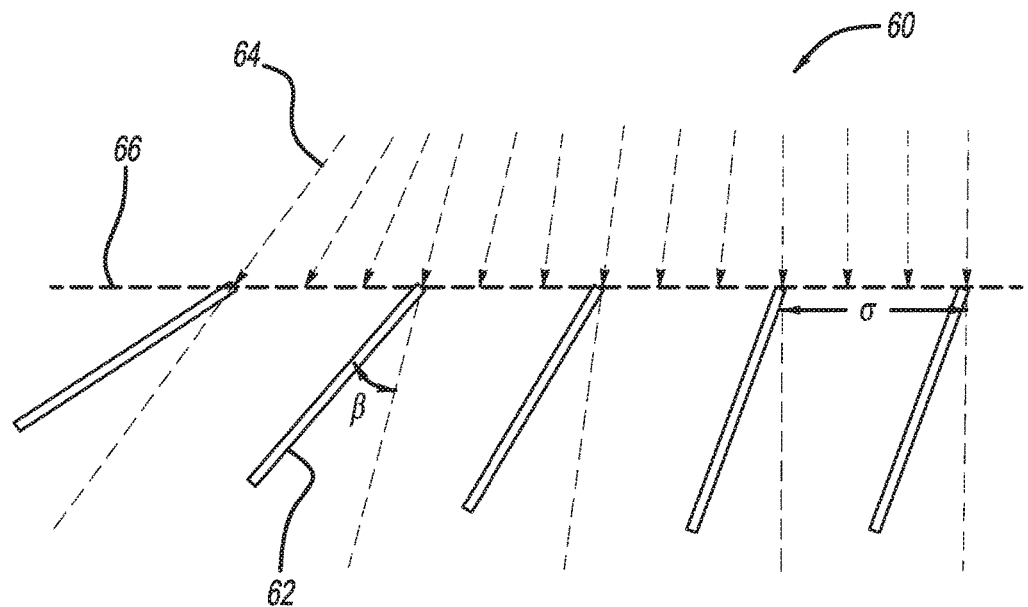
FIG. 6 is a top view illustration of an array of vortex generators.
Figure 7:
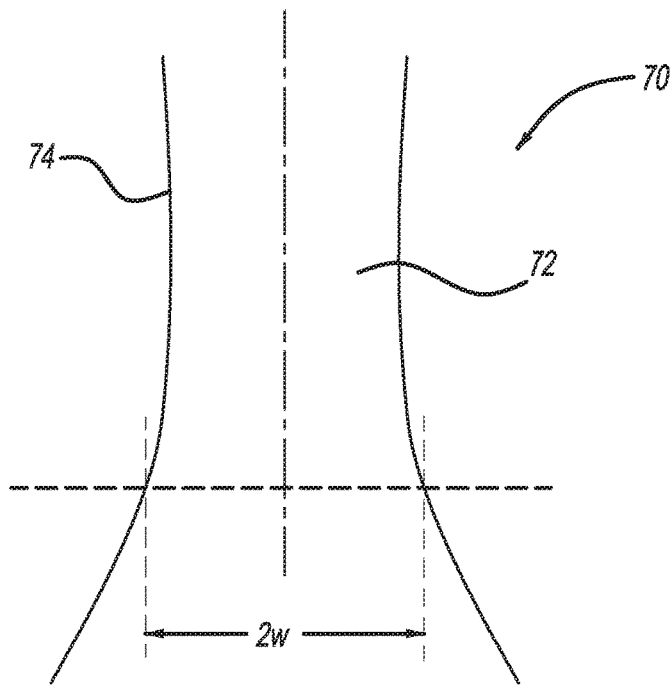
FIG. 7 is a top down illustration of a duct.

FIG. 5 is a side view of a vortex generator blade 50, representing one of the blades 36, shown relative to a flow of air 52 and a duct surface 54, where a top arrow 56 of the flow 52 is the top of the boundary layer where free flow occurs. FIG. 6 is a top view of a vortex generator array 60, representing the array 34, including vortex generator blades 62, airflow vectors 64 and a leading edge 66 of the blades 62. FIG. 7 is an illustration 70 of a surface 72 of a duct 74 that generates secondary flow. For the discussion below for the process of the flow diagram 40, various parameters will be used that are shown in FIGS. 5, 6 and 7. Particularly, $\delta$ is the distance from the duct surface 54 to a height where 99% free stream velocity occurs, i.e., the boundary layer height, $\sigma$ is the spacing between the leading edge 66 of adjacent vortex generator blades 62, $\beta$ is an angle of attack of the vortex generator blades 62 measured relative to a local flow velocity vector 64, i.e., orientation angle of the blades 62, and w is half of the width of the duct 74.

At box 42, the process performs a Navier-Stokes computational fluid dynamic (CFD) solution for an uncontrolled duct, which means performing a computational fluid dynamic numerical analysis and characterizing the airflow through the duct 30 without any vortex generators. As is well understood by those skilled in the art, Navier-Stokes equations describe the motion of a viscous fluid through differential equations, and through CFD these equations can be solved for a given flow problem. This flow control process would determine an average station line across the flow through the duct 30 where a peak adverse pressure gradient occurs that would cause the airflow to separate from the duct surface 32. This analysis also identifies the local boundary height $\delta$ continuously across the span of the duct 30 as a function of position along the average station line. Further, this analysis includes determining the local flow velocity vector at one half of the boundary layer height $\delta$ as a function of the position in the span wise direction along the average station line.

At box 44, the method determines optimal parameters of each of the vortex generator blades 36 based on the flow control analytical model provided at the box 42. The spacing a between the blades 36 is set to be $\sigma/w=0.12$, where the number of the blades 36 would be determined by the spacing $\sigma$ and the width $2w$ of the duct 30. The height of each of the blades 36 is set to be one half of the boundary layer height $\delta/2$ for each blade location across the duct 30 and the length of each blade 36 is set to be four times the boundary layer height $4\delta$ for each blade location across the duct 30, so that the aspect ratio of the length to the height of each of the blades 36 is eight. The orientation angle $\beta$ of each of the blades 36 is a function of position a, and is set to be 10° relative to the local flow velocity vector 64 at one half of the boundary layer height $\delta/2$ for each blade location.

Once the parameters of each of the blades 36 of the array 34 have been determined at the box 44, then the process determines through simulation at box 46 that those parameters provide a suitable pressure recovery and distortion in the duct 30. This process further includes staggering the center line of the blades 36 forward as necessary to control flow at off-design flow conditions.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for optimizing size and position parameters of an array of vortex generator blades configured within an offset duct at an inlet of an aircraft engine, said method comprising:

providing by a processor a computational fluid dynamic analysis of air flowing through the duct that identifies a height of a local boundary layer at a plurality of positions across the duct substantially parallel to the flow of air and a flow velocity vector at each of the plurality of positions at one half of the height of the local boundary layer;

determining an angle orientation of each vortex generator blade at each of the plurality of positions using the height of the local boundary layer and the flow velocity vector;

determining a height of each vortex generator blade at each of the plurality of positions using the height of the local boundary layer;

determining a length of each vortex generator blade at each of the plurality of positions using the height of the local boundary layer;

determining a spacing between the vortex generator blades based on a width of the duct; and determining a number of the vortex generator blades based on the width of the duct and the spacing between the vortex generator blades.

2. The method according to claim 1 wherein providing a computational fluid dynamic analysis includes using Navier-Stokes computational fluid dynamics equations.

3. The method according to claim 1 wherein providing a computational fluid dynamic analysis includes identifying the flow velocity vector at each of the plurality of positions at one half of 99% of the height of the local boundary layer.

4. The method according to claim 1 wherein determining an angle orientation of each vortex generator blade includes using the height of the local boundary layer and the flow velocity vector at a leading edge of the blade.

5. The method according to claim 1 wherein determining an angle orientation of each vortex generator blade includes determining the angle orientation to be 10° relative to the flow velocity vector at one half of the height of the local boundary layer.

6. The method according to claim 1 wherein determining a height of each vortex generator blade includes determining the height of the vortex generator blades to be one half of the height of the local boundary layer.

7. The method according to claim 1 wherein determining a length of each vortex generator blade includes determining the length of the vortex generator blades to be four times the height of the local boundary layer.

8. The method according to claim 1 wherein determining a height and length of the vortex generator blades includes determining a length to height aspect ratio of the vortex generator blades to be eight.

9. The method according to claim 1 wherein determining a spacing between the vortex generator blades includes determining the spacing to be $\sigma/w=0.12$, where $\sigma$ is the spacing and w is one half the width of the duct.

10. The method according to claim 1 wherein the duct is a diffuser.

11. The method according to claim 10 wherein the diffuser is an offset diffuser.

12. The method according to claim 1 further comprising determining whether the angle orientation, height, length, spacing and number of vortex generator blades manages the secondary airflow into the aircraft engine.

13. The method according to claim 12 wherein determining whether the angle orientation, height, length, spacing and number of vortex generator blades manages the secondary airflow includes staggering a centerline of the vortex generator blades forward.

14. A method for optimizing size and position parameters of an array of vortex generator blades configured to an offset diffuser of an aircraft engine, said method comprising:

providing by a processor a computational fluid dynamic analysis of air flowing through the diffuser that identifies a height of a local boundary layer at a plurality of positions across the diffuser substantially parallel to the flow of air and a flow velocity vector at each of the plurality of positions at one half of the height of the local boundary layer;

determining an angle orientation of each vortex generator blade at each of the plurality of positions using the height of the local boundary layer and the flow velocity vector at a leading edge of the blade;

determining a height of each vortex generator blade at each of the plurality of positions to be one half of the height of the local boundary layer;

determining a length of each vortex generator blade at each of the plurality of positions to be four times the height of the local boundary layer;

determining a spacing between the vortex generator blades to be $\sigma/w=0.12$, where $\sigma$ is the spacing and w is one half of a width of the diffuser; and determining a number of the vortex generator blades based on the width of the diffuser and the spacing between the vortex generator blades.

15. The method according to claim 14 wherein providing a computational fluid dynamic analysis of air flowing through the diffuser includes using Navier-Stokes computational fluid dynamics equations.

16. The method according to claim 14 wherein providing a computational fluid dynamic analysis of air flowing through the diffuser includes identifying the flow velocity vector at each of the plurality of positions at one half of the height of the local boundary layer.

17. The method according to claim 14 wherein determining an angle orientation of each vortex generator blade includes determining the angle of orientation to be 10° relative to the airflow vector at one half of the height of the local boundary layer.

18. A system for optimizing size and position parameters of an array of vortex generator blades configured on an offset diffuser at an inlet of an aircraft engine, said system comprising:

means including a processor for providing a computational fluid dynamic analysis of air flowing through the diffuser that identifies a height of a local boundary layer at a plurality of positions across the diffuser substantially parallel to the flow of air and a flow velocity vector at each of the plurality of positions at one half of the height of the local boundary layer;

means for determining an angle orientation of each vortex generator blade at each of the plurality of positions using the height of the local boundary layer and the flow velocity vector at a leading edge of the blade;

means for determining a height of each vortex generator blade at each of the plurality of positions to be one half of the height of the local boundary layer;

means for determining a length of each vortex generator blade at each of the plurality of positions to be four times the height of the local boundary layer;

means for determining a spacing between the vortex generator blades to be $\sigma/w=0.12$, where $\sigma$ is the spacing and w is one half of a width of the diffuser; and means for determining a number of the vortex generator blades based on the width of the diffuser and the spacing between the vortex generator blades.

19. The system according to claim 18 wherein the means for providing a computational fluid dynamic analysis of air flowing through the diffuser uses Navier-Stokes computational fluid dynamics equations.

20. The system according to claim 18 wherein the means for providing a computational fluid dynamic analysis of air flowing through the diffuser identifies the flow velocity vector at each of the plurality of positions at one half of the height of the local boundary layer.

21. The system according to claim 18 wherein the means for determining an angle orientation of each vortex generator blade determines the angle of orientation to be 10° relative to the airflow vector at one half of the height of the local boundary layer.

* * * * *